United States Patent [19]

Bourseau et al.

[11] Patent Number: 5,281,642
[45] Date of Patent: Jan. 25, 1994

[54] GELLED PREMIXES BASED ON HEAT-RESISTANT POLYMERS AND POLYVINYL CHLORIDE-BASED COMPOSITIONS CONTAINING SUCH GELLED PREMIXES

[75] Inventors: Bernard Bourseau; Jean Criquilion, both of Brussels, Belgium

[73] Assignee: Solvay (Société Anonyme), Brussels, Belgium

[21] Appl. No.: 792,264

[22] Filed: Nov. 18, 1991

[30] Foreign Application Priority Data

Nov. 16, 1990 [BE] Belgium .............................. 09001079
Sep. 30, 1991 [BE] Belgium .............................. 09100901

[51] Int. Cl.$^5$ .............................................. C08K 5/20
[52] U.S. Cl. ................................... 524/230; 524/312; 524/377; 524/378; 524/398
[58] Field of Search ............... 524/230, 312, 377, 378, 524/398

[56] References Cited

U.S. PATENT DOCUMENTS 2,646,417 7/1953 Jennings .
4,169,195 9/1979 Rinehart .
4,246,374 1/1981 Kopchik .
4,255,322 3/1981 Kopchik .
4,504,623 3/1985 Heuschen et al. .
4,595,727 6/1986 Doak .

FOREIGN PATENT DOCUMENTS 35341 9/1981 European Pat. Off. .
0037686 10/1981 European Pat. Off. .
1222249 8/1966 Fed. Rep. of Germany .
2073617 10/1971 France .
2312537 12/1976 France .
1084594 9/1967 United Kingdom .

Primary Examiner—Joseph L. Schofer
Assistant Examiner—Peter D. Mulcahy
Attorney, Agent, or Firm—Spencer, Frank & Schneider

[57] ABSTRACT

Gelled premixes based on heat-resistant polymers whose Vicat softening point is higher than 100° C., containing an impact strength improver and a lubricant for polyvinyl chloride and polyvinyl chloride-based compositions containing such gelled premixes. The incorporation of heat-resistant polymers in the form of gelled premixes results in perfectly homogeneous polyvinyl chloride-based compositions which are converted without any problems at the usual temperatures for processing polyvinyl chloride into shaped articles with improved heat resistance.

22 Claims, No Drawings

GELLED PREMIXES BASED ON HEAT-RESISTANT POLYMERS AND POLYVINYL CHLORIDE-BASED COMPOSITIONS CONTAINING SUCH GELLED PREMIXES

The present invention relates to gelled premixes based on heat-resistant polymers and to polyvinyl chloride-based compositions with improved heat resistance, containing such gelled premixes.

In some applications of vinyl chloride polymers which require an increased heat resistance (or heat deformation temperature) it is indispensable to incorporate therein before processing a polymer with a heat resistance which is higher than that of polyvinyl chloride. The Vicat softening temperature (generally referred to as the "Vicat temperature") of polyvinyl chloride is in the region of 70° to 80° C. Heat-resistant polymers are intended hereinafter to denote polymers whose Vicat temperature is higher than that of polyvinyl chloride and more particularly higher than 100° C. Polyglutarimides and copolymers of styrene and/or of α-methylstyrene with nitriles and, optionally, (meth)acrylic esters (commonly referred to as SAN resins) represent well-known examples of polymers which can be employed to improve the heat resistance of vinyl chloride polymers.

Unfortunately, melt processing of compositions based on polyvinyl chloride and polymers whose Vicat point is higher than that of polyvinyl chloride presents very severe problems because of the excessively great difference in the viscosity between the heat-resistant polymer and the polyvinyl chloride. The problem is all the more acute the more effective the heat-resistant polymer, that is to say the higher its Vicat temperature and, furthermore, the lower the molecular weight (or the K value) of the polyvinyl chloride.

The processing of compositions based on polyvinyl chloride and heat-resistant polymers, apart from intense shearing which is very detrimental to the heat stability of polyvinyl chloride, can result in compositions which completely lack homogeneity and thus in shaped objects whose mechanical properties, such as impact strength—resistance.

The present invention provides gelled premixes based on heat-resistant polymers which can be employed to improve the heat resistance of polyvinyl chloride and which do not exhibit any of the abovementioned disadvantages.

To this end, the invention relates to gelled premixes based on heat-resistant polymers whose Vicat softening temperature (50N) is higher than 100° C., characterised in that they contain an impact strength improver and a lubricant for polyvinyl chloride.

The Vicat softening temperature (50N) can be measured according to anyone of the standards ASTM D 1525, DIN 53460 and ISO 306.

The incorporation into the polyvinyl chloride of heat-resistant polymers in the form of a gelled premix according to the invention results in perfectly homogeneous polyvinyl chloride-based compositions which can be converted without any problems at the usual temperatures for processing polyvinyl chloride into shaped articles with improved heat resistance.

For the purpose of the present invention, polyvinyl chloride is intended to denote both the homopolymers and the copolymers of vinyl chloride containing at least 80% by weight of monomer units derived from vinyl chloride and their mixtures. Nevertheless, preference is given to vinyl chloride homopolymers.

As already stated above, a heat-resistant polymer is intended to denote polymers whose Vicat softening temperature (50N) is higher than 100° C. Preference is given to polymers whose Vicat softening temperature (50N) is higher than 110° C. and, furthermore, does not exceed 150° C.

By way of nonlimiting examples of heat-resistant polymers which can be employed within the scope of the present invention there may be mentioned copolymers of styrene and maleic anhydride, copolymers of styrene and methylmethacrylate, copolymers of acrylonitrile, butadiene, styrene and α-methylstyrene, commonly called "heat" ABS resins, polyglutarimides, and copolymers of styrene and/or α-methylstyrene and (meth)acrylonitriles and, optionally, (meth)acrylic esters, generally referred to as "SAN resins".

Heat-resistant polymers which are particularly preferred according to the present invention are polyglutarimides and SAN resins. Polyglutarimides which can be employed according to the present invention are described, for example, in Patents BE-A-848,486 of 18 Nov. 1976 and U.S. Pat. No. 4,246,374 of 23 Apr. 1979, both in the name of Rohm & Haas. SAN resins which can be employed according to the present invention are described, for example, in Patents FR-A-1,047,954 in the name of The Goodrich Co and U.S. Pat. No. 4,169,195 in the name of Borg Warner Corp.

Among polyglutarimides, preference is given to poly-N-alkylglutarimides in which the alkyl groups contain from 1 to 20 carbon atoms, and still more particularly to poly-N-methylglutarimides. Among SAN resins preference is given to copolymers of styrene and/or α-methylstyrene and acrylonitrile, more particularly to copolymers of styrene and/or α-methylstyrene containing from 5 to 50 % by weight of acrylonitrile and still more particularly to such copolymers containing from 15 to 40% by weight of acrylonitrile.

Gelled premixes based on a heat-resistant polymer are intended to denote premixes which have been subjected to a kneading operation at a temperature above the glass transition temperature of the heat-resistant polymer, an operation which is commonly referred to as compounding.

The invention results from the surprising finding that the pregelling of the heat-resistant polymer in the presence of an impact strength improver for polyvinyl chloride and of a lubricant for polyvinyl chloride lowers the cohesion and the viscosity of the heat-resistant polymer to such an extent that it becomes possible to produce compositions based on polyvinyl chloride and on heat-resistant polymer which can be processed without any problems under the usual temperature conditions for polyvinyl chloride, even at the reduced temperatures at which it is advisable to process polyvinyl chlorides of low K value, such as more particularly those intended for injection moulding.

The impact strength improvers, referred to hereinafter as "anti-impact agents", which are suitable for preparing the gelled premixes based on heat-resistant polymer according to the invention can be chosen indiscriminately from any of the usual anti-impact agents for polyvinyl chloride. By way of nonlimiting examples of such anti-impact agents there may be mentioned methyl methacrylate/butadiene/styrene copolymers, commonly called MBS resins, acrylonitrile/butadiene/styrene copolymers, commonly called ABS resins, chlorinated polyethylenes, anti-impact acrylic resins, copolymers of vinyl acetate and ethylene and graft copolymers of vinyl chloride on copolymers of vinyl acetate and ethylene and mixtures thereof. The anti-impact agent is preferably chosen from MBS resins, ABS resins and anti-impact acrylic resins (and mixtures thereof).

The quantity of anti-impact agent employed in the gelled premixes based on heat-resistant polymer is not particularly critical. The optimum quantity will be advantageously assessed by experiments in each particular case. Broadly speaking, it is generally preferable to employ at least 2 parts thereof per 100 parts by weight of heat-resistant polymer, more particularly at least 5 parts and, still more particularly at least 10 parts. In the case where the intention is finally to produce heat-resistant shaped polyvinyl chloride articles with improved impact strength, larger quantities of anti-impact agent can be incorporated without disadvantage in the gelled premix based on heat-resistant polymer. As a general rule, however, a concentration of anti-impact agent of 200 parts per 100 parts by weight of heat-resistant polymer will not be exceeded, a preferred concentration range extending from 25 to 150 parts of anti-impact agent per 100 parts by weight of heat-resistant polymer.

The lubricants which can be employed for manufacturing the gelled premixes according to the invention can be chosen indiscriminately from any of the usual lubricants for polyvinyl chloride, that is to say so-called external lubricants, including the processing aids of external lubricant nature and the so-called internal lubricants, including viscosity-reducing agents of internal lubricant nature.

The external lubricant nature is generally attributed to lubricants of low polarity and low compatibility with polyvinyl chloride, the essential function of which consists in preventing its adhesion to the hot metal surfaces of the equipment employed for its melt processing. By way of nonlimiting examples of such external lubricants for polyvinyl chloride there may be mentioned polyethylene waxes, oxidised polyethylene waxes, paraffin waxes with long linear chains or shorter branched chains, and processing aids of external lubricant nature, such as acrylic processing aids, and mixtures thereof. External lubricants which are preferred within the scope of the present invention are acrylic processing aids.

The internal lubricant nature is generally attributed to polar lubricants which are relatively compatible with polyvinyl chloride, the essential function of which consists in modifying the cohesive forces of the polymeric chains of the polyvinyl chloride. By way of nonlimiting examples of such internal lubricants for polyvinyl chloride there may be mentioned glycerine $C_{14}-C_{18}$ monoesters, $C_{14}-C_{18}$ fatty alcohols, fatty acids and their salts, amides derived from fatty acids, hydrogenated oils, and viscosity reducers such as aliphatic polyols and their oligomers and mixtures thereof.

According to a particularly preferred embodiment of the present invention the gelled premix based on heat-resistant polymer includes at least one internal lubricant such as defined above.

Internal lubricants which are preferred within the scope of the present invention are glycerine monoesters (such as, for example, glycerol monostearate), amides derived from fatty acids (such as, for example, ethylenedistearamide), fatty acid salts (such as, for example, calcium or lead stearates) and viscosity-reducing aliphatic polyols (such as, for example, bistrimethylolpropane).

The quantity of lubricant for polyvinyl chloride, as defined above, which is employed in the gelled premixes according to the invention is not particularly critical either. The optimum quantity will also be advantageously assessed by experiments. Broadly speaking, it is generally preferable to employ at least 5 parts thereof per 100 parts by weight of heat-resistant polymer and, still more particularly, at least 10 parts. The quantity of lubricant will usually not exceed 75 parts by weight per 100 parts of heat-resistant polymer, a generally preferred concentration range extending from 15 to 50 parts by weight.

Preferred gelled premixes therefore include, per 100 parts by weight of heat-resistant polymer, from 25 to 150 parts of anti-impact agent (or of a mixture of anti-impact agents) for polyvinyl chloride and from 15 to 50 parts by weight of lubricant (or of a mixture of lubricants) for polyvinyl chloride.

The gelling of the premixes based on the heat-resistant polymer, impact strength improver and lubricant for polyvinyl chloride is performed in a known manner, for example by extruding the ingredients of the premix or by kneading them in an internal mixer and at temperatures above the glass transition temperature of the heat-resistant polymer. The extruded rods and the sheets calendered by running on rolls the material gelled in the internal mixer are next subjected to a granulation operation. These granules can be incorporated as such or after milling with polyvinyl chloride with a view to preparing polyvinyl chloride-based compositions with improved heat resistance.

The invention also relates to compositions based on polyvinyl chloride and heat-resistant polymer in which the heat-resistant polymer is present in the form of a gelled premix based on the heat-resistant polymer, and the anti-impact agent and lubricant for polyvinyl chloride, as described above. These compositions are manufactured by mixing, by means of conventional mixing techniques, the gelled premix based on heat-resistant polymer, in the form of granules or powders (micronised granules), with polyvinyl chloride and its usual processing ingredients such as heat-stabilisers, lubricants, fillers, pigments, and the like. It is obvious that in formulating the polyvinyl chloride allowance will be made for the quantities of anti-impact agent and lubricant which are already present in the premix based on heat-resistant polymer.

The content of heat-resistant polymer in the polyvinyl chloride-based compositions will, of course, depend on the intended degree of heat resistance. Broadly speaking, compositions based on polyvinyl chloride and heat-resistant polymer generally contain from 98 to 40 parts of polyvinyl chloride per 2 to 60 parts by weight of heat-resistant polymer and, more particularly, from 90 to 50 parts of polyvinyl chloride per 10 to 50 parts by weight of heat-resistant polymer.

Heat-resistant compositions which are very particularly preferred according to the present invention contain, as polyvinyl chloride, a vinyl chloride homopolymer whose K value is lower than 65 and, still more particularly, lower than 55.

The compositions based on polyvinyl chloride and heat-resistant polymer according to the invention are particularly suited for the manufacture of polyvinyl chloride articles which are to be subjected to high thermal and mechanical stresses, such as, for example, hotfillable packaging, profiles which are driven in for external frames or certain injection-moulded articles. They are very particularly suited for the injection moulding of heat-resistant polyvinyl chloride articles which are strengthened against impact, such as components for office equipment, electrical boxes and housings, domestic electrical appliance housings, and the like.

The examples which follow are intended to illustrate the invention. All the quantities are expressed on a weight basis.

Example 1, according to the invention, relates to a gelled premix based on SAN resin and to a composition based on polyvinyl chloride and on the said gelled premix based on SAN resin.

Examples 2 and 3, which are given by way of comparison, are related to compositions based on polyvinyl chloride and SAN resin of a weight composition identical with that of Example 1. In Example 2 the composition is obtained by mixing all the ingredients in one stage. In Example 3 the composition is obtained by mixing polyvinyl chloride and its processing ingredients, (containing all of the lubricant) with a gelled premix based on SAN resin and anti-impact agent free from lubricant.

Example 4, according to the invention relates to a gelled premix based on poly-N-glutarimide, and to a composition based on polyvinyl chloride and on the said gelled premix based on poly-N-glutarimide containing an acrylic anti-impact agent.

Example 5, given by way of comparison, relates to a composition based on polyvinyl chloride and on poly-N-glutarimide of weight composition identical with that of Example 4, obtained by mixing all the ingredients in one stage.

Example 6, according to the invention, relates to a gelled premix based on poly-N-glutarimide and to a composition based on polyvinyl chloride and on the said gelled premix based on poly-N-glutarimide containing an anti-impact agent of the MBS type.

Example 7, given by way of comparison, relates to a composition based on polyvinyl chloride and on poly-N-glutarimide of weight composition identical with that of Example 6, obtained by mixing all the ingredients in one stage.

Example 8, given by way of comparison, relates to a composition based on polyvinyl chloride and on poly-N-glutarimide of weight composition identical with that of Example 6, obtained by mixing polyvinyl chloride and its processing ingredients (containing all the lubricant) with a gelled premix based on poly-N-glutarimide and anti-impact agent free from lubricant.

EXAMPLE 1

1. Gelled premix based on SAN resin

The following ingredients are mixed for 20 minutes in a slow mixer without any temperature rise, in the following proportions:

| | |
|---|---|
| SAN resin (marketed by Monsanto under the trademark Elix 230 B) whose Vicat temperature (50N) is 116° C. | 29 |
| ABS anti-impact agent (marketed by Monsanto under the trademark Elix 104 C) | 16 |
| Acrylic anti-impact agent (marketed by Rohm & Haas under the trademark KM 355) | 3 |
| Antioxidant | 0.25 |

(mix 1.1)

Using an identical procedure, the following ingredients are mixed separately:

| | |
|---|---|
| Calcium stearate | 2 |
| Ethylenedistearamide | 2.5 |
| Acrylic processing aid (marketed by Rohm & Haas under the trademark Paraloid K 175) | 1 |
| Bistrimethylolpropane | 1.5 |

(mix 1.2)

Mix 1.1 (heat-resistant and anti-impact agents) is gelled in an internal mixer until it sets (which takes place at about 165° C.), at which time mix 1.2 (lubricants) is incorporated and heating is continued until a temperature of 180° C. is reached, after which the material is discharged. The crepe obtained is then kneaded for 2 minutes at 150° C. and then granulated after cooling.

2. Composition based on polyvinyl chloride and on SAN resin

The following ingredients are mixed in a fast mixer in which the material is heated by friction up to 110° C., in the following proportions:

| | |
|---|---|
| Polyvinyl chloride (K value 50) | 65 |
| Tin stabiliser | 1.6 |
| Precipitated calcium carbonate | 5 |
| Titanium oxide | 2 |

(mix 2)

As soon as the material reaches 110° C. the resulting mixture is discharged into a cooler-mixer which is discharged when the temperature has reached 40° C.

An extruder with two conventional screws rotating in the same direction is fed with a mixture consisting of all of the gelled premix obtained under point 1 and all the polyvinyl chloride-based mix obtained under point 2, in which the material is gelled at 180° C. The resulting gelled composition is granulated after cooling.

EXAMPLE 2

(Comparative)

All the ingredients of the premix based on SAN resin (point 1) and all the polyvinyl chloride-based composition (point 2) of Example 1 are mixed in one stage and this mixture is gelled by extrusion and the gelled mixture is then granulated under conditions which are identical with those of Example 1, point 2.

EXAMPLE 3

(Comparative)

1. A gelled premix containing only the ingredients of mix 1.1 (SAN resin and anti-impact agents) of Example 1 is prepared under conditions which are identical with those of Example 1, point 1. A second mix is prepared separately, containing all the ingredients of mix 1.2 (that is to say the lubricants) and the polyvinyl chloride-based composition (mix 2). The gelled premix and the mixture of lubricants (mix 1.2) and of the polyvinyl chloride-based composition (mix 2) are mixed, gelled and granulated under conditions which ar identical with those of Example 1, point 2.

Evaluation of the properties of test pieces injection moulded from granules obtained according to Examples 1 to 3 (Table 1)

Two series of test pieces were injection-moulded at 200° C. from granules obtained according to Examples 1, 2 and 3. The Izod notched resilience at 23° C. was evaluated according to ISO standard 180 on the first series, 3.2 mm in thickness. The Vicat softening temperature (50N) was evaluated according to ISO standard 306 on the second series, 6 mm in thickness.

The results of the evaluations appear in Table 1. Comparison of these results shows the very appreciable improvement in the Izod resilience, bearing witness to a much higher homogeneity of the samples according to the invention (Example 1) when compared with samples of identical composition, obtained by mixing all the ingredients in one stage (Example 2, comparative) or by resorting to a gelled premix containing the heat-resistant lubricant(s) (Example 3, comparative).

TABLE 1

| No. | Notched Izod resilience, kJ/m² | Vicat (50N) |
| --- | --- | --- |
| 1 | 34.2 | 82 |
| 2 | 8.7 | 79 |
| 3 | 16.9 | 80 |

EXAMPLE 4

1. Gelled premix based on polyglutarimide

The following ingredients are mixed for 20 minutes in a slow mixer without any temperature rise, in the following proportions:

| | |
| --- | --- |
| Poly-N-methylglutarimide (marketed by Rohm & Haas under trademark Paraloid HT 510) | 12 |
| Acrylic anti-impact agent (marketed by Rohm & Haas under the trademark Paraloid KM 323 B) | 15 |
| Acrylic processing aid (marketed by Rohm & Haas under trademark Paraloid K 175) | 1.25 |
| Neutral lead stearate | 2.5 |
| (mix 4.1) | |

This mix is gelled by running in an internal mixer and discharged when the temperature of the mix reaches 230° C. The discharged material is granulated after a crepe has been formed on a roll mill at 180° C. 2. Composition based on polyvinyl chloride and polyglutarimide The following ingredients are mixed in a fast mixer in which the material is heated by friction up to 110° C., in the following proportions:

| | |
| --- | --- |
| Polyvinyl chloride (K value 60) | 100 |
| Lead (tribase) stabiliser | 7 |
| External lubricants (waxes) | 0.8 |
| Calcium stearate | 0.5 |
| Acrylic processing aid | 1 |
| Titanium dioxide | 5.6 |
| (mix 4.2) | |

As soon as the material reaches the temperature of 110° C., the resulting mixture is discharged into a cooler-mixer, all the gelled premix obtained under point 1 is introduced therein and the whole is mixed at a low speed while cooling to 40° C.

The resulting composition is then gelled by running in an internal mixer with discharging when the temperature of the material reaches 185° C. This material is converted into a crêpe by running on a roll mill at 180° C. and is then granulated after cooling.

EXAMPLE 5

(Comparative)

All the ingredients of the premix based on poly-N-glutarimide (mix 4.1) and of the polyvinyl chloride-based composition (mix 4.2) from Example 4 are mixed in one stage and are gelled by extrusion and the gelled mixture is then granulated under conditions which are identical with those of Example 4, point 2.

Evaluation of the properties of test pieces injection moulded from granules obtained according to Example 4 and 5 (Table 2)

Junction boxes (housings) for electrical connections were manufactured by injection moulding at 205° C. from granules obtained according to Examples 4 and 5. An impact test was carried out on one face, 2.5 mm in thickness, by dropping a weight (50N at 23° C.) according to NFC standard 20 010. The height in metres corresponding to the breakage of 50% of the samples (H50) is higher than 2.2 m in the case of the samples according to Example 4 and equal to 0.2 m in the case of the samples according to Example 5, for comparison. Comparison of the results adequately shows the appreciable improvement in the impact strength and hence in the homogeneity which is obtained with the compositions based on gelled premixes according to the invention (Example 4).

EXAMPLE 6

1. Gelled premix based on polyglutarimide

The following ingredients are mixed for 20 minutes in a slow mixer without any rise in temperature, in the following proportions:

| | |
| --- | --- |
| Poly-N-methylglutarimide (marketed by Rohm & Haas under trademark Paraloid HT 510) | 20 |
| MBS anti-impact agent | 10 |
| Acrylic processing aid (marketed by Rohm & Haas under trademark Paraloid K 175) | 2 |
| Internal lubricant (glycerol monostearate) | 2 |
| (mix 6.1) | |

This mix is then gelled at 200° C. in an extruder with two conventional screws rotating in the same direction and is then cooled and granulated.

2. Composition based on polyvinyl chloride and polyglutarimide

The following ingredients are mixed in a fast mixer in which the material is heated by friction up to 110° C., in the following proportions:

| | |
| --- | --- |
| Polyvinyl chloride (K value 50) | 100 |
| Tin stabiliser | 3 |
| External lubricant | 0.5 |
| (mix 6.2) | |

As soon as the material reaches the temperature of 110° C. the resulting mix is discharged into a cooler-mixer and the mix is discharged when the temperature reaches 40° C.

An extruder with two conventional screws rotating in the same direction is fed with a mixture consisting of all of the gelled premix obtained under point 1 and all of the polyvinyl chloride-based mix obtained under point 2, in which the material is gelled at 170° C. The resulting gelled composition is then granulated after cooling.

EXAMPLE 7

Comparative

All the ingredients of the premix based on poly-N-glutarimide (mix 6.1) and of the polyvinyl chloride-based composition (mix 6.2) of Example 6 are mixed in one stage and the mixture is gelled by extrusion and the gelled mixture is then granulated under conditions which are identical with those of Example 6, point 2.

EXAMPLE 8

Comparative

A gelled premix containing only poly-N-glutarimide and the MBS anti-impact agent of the mix 6.1 of Example 6 is prepared under conditions which are identical with those of Example 6, point 1. A second mixture is prepared separately, containing all the other ingredients of mix 6.1 (i.e. the acrylic processing aid and the internal lubricant) and the polyvinyl chloride-based composition (mix 6.2). The gelled premix and the mixture of lubricants and of the polyvinyl chloride-based composition (mix 6.2) are mixed, gelled and granulated under conditions which are identical with those of Example 6, point 2.

Evaluation of the properties of test pieces injection moulded from granules obtained according to Examples 6 to 8

Granules obtained according to Examples 6, 7 and 8 were used to manufacture sheets with a thickness of 2.2 mm by injection moulding at 200° C, and an impact test was performed on these by dropping a weight at 23° C. according to ASTM standard D 4226.

The mean energy of rupture corresponding to the breakage of 50% of the samples (E50) is 3.18 J/mm in the case of samples according to Example 6, 1.56 J/mm in the case of the samples according to Example 7 and 2.56 J/mm in the case of the samples according to Example 8. Comparison of the results shows the significant improvement in the impact strength and hence in the homogeneity of the samples according to the invention (Example 6) when compared with samples of identical composition, obtained by mixing all the ingredients in one stage (Example 7, comparative) or by resorting to a gelled premix containing the heat-resistant polymer and the anti-impact agent but free from lubricant(s) (Example 8, comparative).

We claim:

1. A gelled premix consisting of a heat-resistant polymer whose Vicat softening temperature (50N) is higher than about 100° C., an impact strength improver, and a lubricant for polyvinyl chloride.

2. A gelled premix consisting essentially of a heat-resistant polymer whose Vicat softening temperature (50N) is higher than about 100° C., an impact strength improver, and a lubricant for polyvinyl chloride, provided that said gelled premix does not include polyvinyl chloride.

3. The gelled premix according to claim 2, wherein the impact strength improver is chosen from methyl methacrylate/butadiene/styrene copolymers, acrylonitrile/butadiene/styrene copolymers and anti-impact acrylic resins and mixtures thereof.

4. The gelled premix according to claim 2, wherein the impact strength improver is employed in a proportion of at least 2 parts and not more than about 200 parts per 100 parts by weight of heat-resistant polymer.

5. The gelled premix according to claim 2, wherein the lubricant comprises at least one internal lubricant for polyvinyl chloride.

6. The gelled premix according to claim 5, wherein the internal lubricant is chosen from glycerine monoesters, amides derived from fatty acids, fatty acid salts and aliphatic polyols and mixtures thereof.

7. The gelled premix according to claim 2, wherein the lubricant is employed in a proportion of at least 5 parts and not more than about 75 parts per 100 parts by weight of heat-resistant polymer.

8. The gelled premix according to claim 2, wherein the heat-resistant polymer is chosen from copolymers of styrene and maleic anhydride, copolymers of styrene and methyl methacrylate, copolymers of acrylonitrile, butadiene, styrene and α-methylstyrene, polyglutarimide, copolymers of styrene, α-methylstyrene, a mixture of styrene and α-methylstyrene and (meth)acrylonitrile.

9. The gelled premix according to claim 2, wherein the heat-resistant polymer is chosen from poly-N-alkylglutarimides in which the alkyl groups contain from 1 to 20 carbon atoms and copolymers of styrene, α-methylstyrene, a mixture of styrene and α-methylstyrene, and acrylonitrile.

10. The gelled premix according to claim 2, wherein the heat-resistant polymer is chosen from poly-N-methylglutarimides and copolymers of styrene, α-methylstyrene, a mixture of styrene and α-methylstyrene, and containing from about 5 to 50% by weight of acrylonitrile.

11. A composition consisting essentially of from about 98 to 40 parts by weight of polyvinyl chloride and about 2 to 60 parts by weight of a gelled premix consisting essentially of a heat-resistant polymer whose Vicat softening temperature (50N) is higher than about 100° C., an impact strength improver, and a lubricant for polyvinyl chloride.

12. The composition according to claim 11, wherein the polyvinyl chloride is a vinyl chloride homopolymer exhibiting a K value lower then 65.

13. The gelled premix according to claim 1, wherein the heat-resistant polymer is chosen from copolymers of styrene and maleic anhydride, copolymers of styrene and methyl methacrylate, copolymers of acrylonitrile, butadiene, styrene and α-methylstyrene, polyglutarimide, copolymers of styrene, α-methylstyrene, a mixture of styrene and α-methylstyrene, (meth)acrylonitrile and (meth)acrylic ester.

14. The composition set forth in claim 11, wherein said gelled premix includes an impact strength improver chosen from methyl methacrylate/butadiene/styrene copolymers, acrylonitrile/butadiene/styrene copolymers and anti-impact acrylic resins and mixtures thereof.

15. The composition according to claim 11, wherein said gelled premix includes an impact strength improver in a proportion of at least 2 parts and not more than about 200 parts per 100 parts by weight of heat-resistant polymer.

16. The composition according to claim 11, wherein said gelled premix includes a lubricant for polyvinyl chloride comprising at least one internal lubricant for polyvinyl chloride.

17. The composition according to claim 16, wherein said internal lubricant is chosen from glycerine monoesters, amides derived from fatty acids, fatty acid salts and aliphatic polyols and mixtures thereof.

18. The composition according to claim 11, wherein said gelled premix includes a lubricant in a proportion of at least 5 parts and not more than about 75 parts per 100 parts by weight of heat-resistant polymer.

19. The composition according to claim 11, wherein said gelled pre-mix includes a heat-resistant polymer chosen from copolymers of styrene and maleic anhydride, copolymers of styrene and methyl methacrylate, copolymers of acrylonitrile, butadiene, styrene and α-methylstyrene, polyglutarimide, copolymers of styrene, α-methylstyrene, a mixture of styrene and α-methylstyrene and (meth)acrylonitrile.

20. The composition according to claim 11, wherein said gelled premix includes a heat-resistant polymer chosen from poly-N-alkylglutarimides in which the alkyl groups contain from 1 to 20 carbon atoms and copolymers of styrene, α-methylstyrene, a mixture of styrene and α-methylstyrene, and acrylonitrile.

21. The composition according to claim 11, wherein said gelled premix includes a heat-resistant polymer chosen from poly-N-alkylglutarimides and copolymers of styrene, α-methylstyrene, a mixture of styrene and α-methylstyrene, and containing from about 5 to 50% by weight of acrylonitrile.

22. The composition according to claim 11, wherein said gelled premix includes a heat-resistant polymer chosen from copolymers of styrene and maleic anhydride copolymers of styrene and methyl methacrylate, copolymers of acrylonitrile, butadiene, styrene and α-methylstyrene, polyglutarimide, copolymers of styrene, α-methylstyrene, a mixture of styrene and α-methylstyrene, (meth)acrylonitrile and (meth)acrylic ester.

* * * * *